No. 733,027. PATENTED JULY 7, 1903.
S. O. GOLDAN.
INHALER.
APPLICATION FILED FEB. 28, 1903.
NO MODEL. 3 SHEETS—SHEET 3.
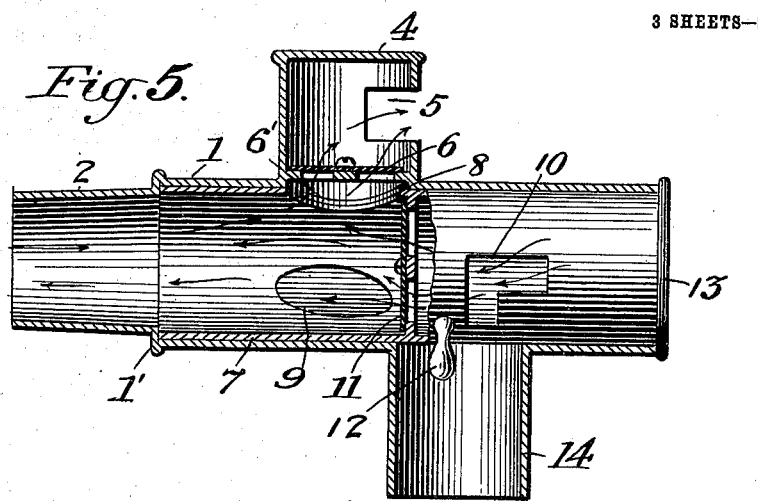
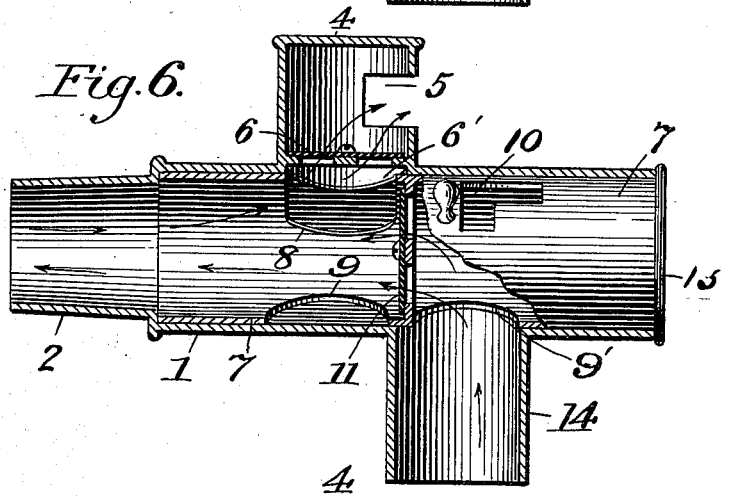
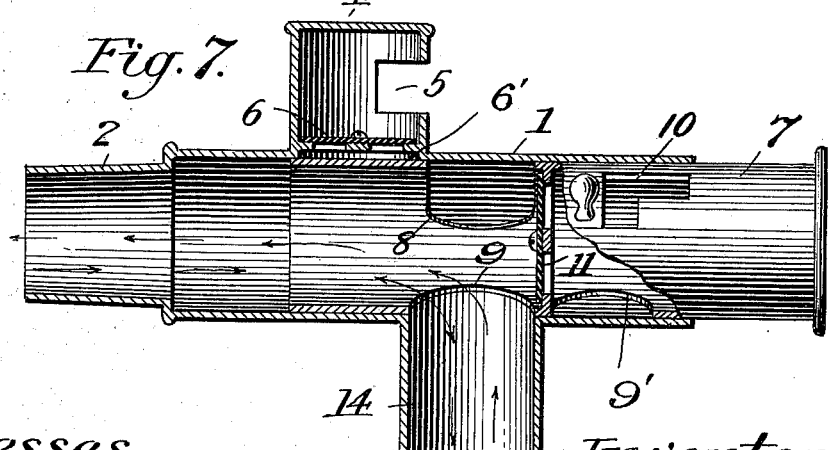

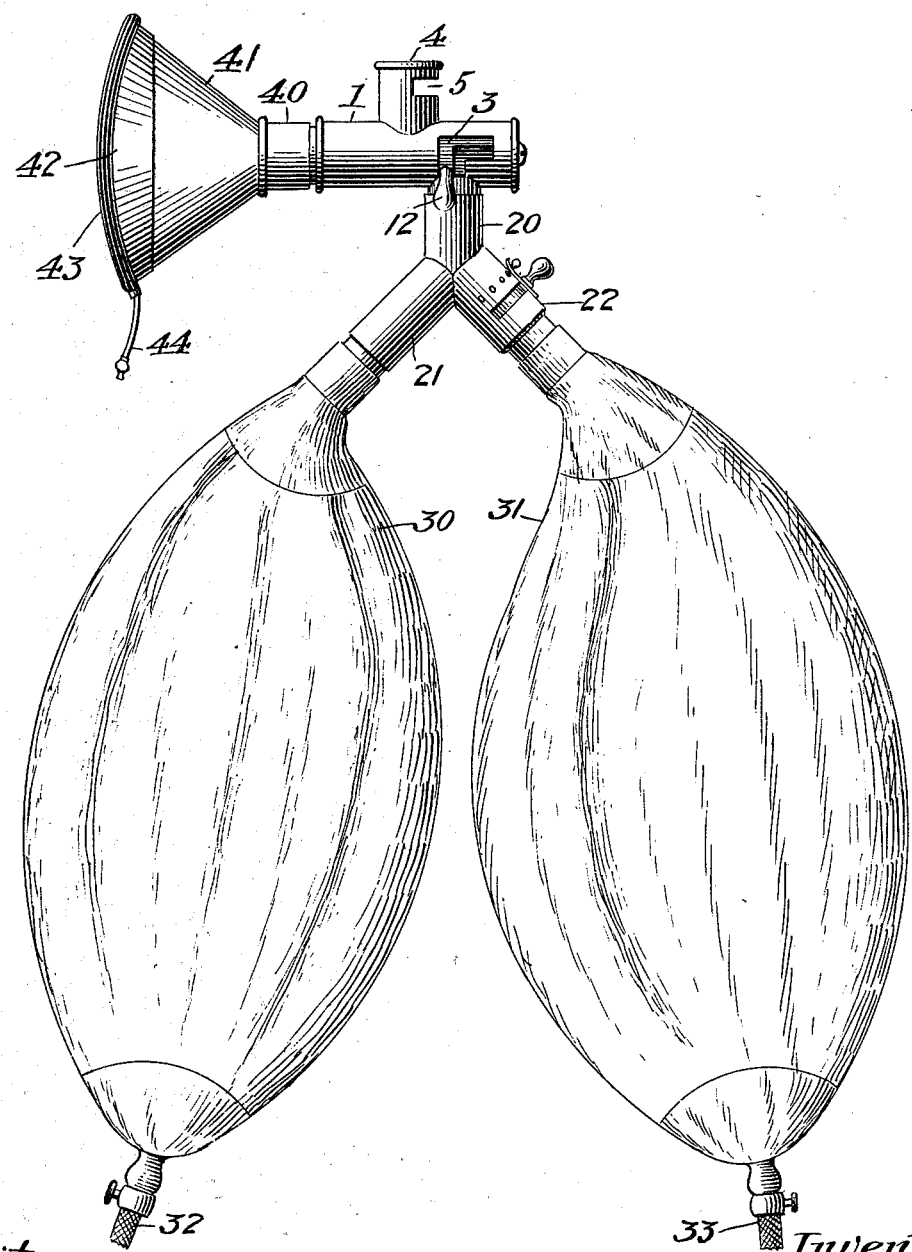

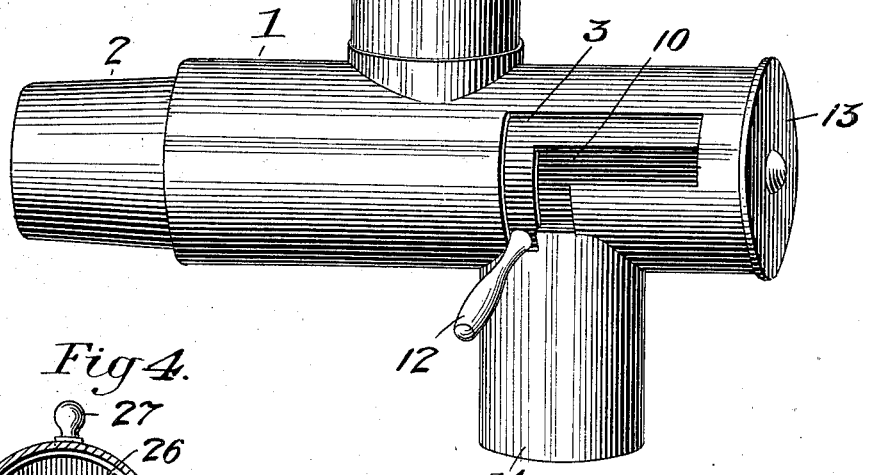

No. 733,027. Patented July 7, 1903.

UNITED STATES PATENT OFFICE.

SYDNEY ORMOND GOLDAN, OF NEW YORK, N. Y., ASSIGNOR TO FREDERICK TAGLIAVIA-TANINI, OF NEW YORK, N. Y.

INHALER.

SPECIFICATION forming part of Letters Patent No. 733,027, dated July 7, 1903.

Application filed February 28, 1903. Serial No. 145,575. (No model.)

*To all whom it may concern:*

Be it known that I, SYDNEY ORMOND GOLDAN, a citizen of the United States, residing at New York, county and State of New York, have invented certain new and useful Improvements in Inhalers; and I do hereby declare the following to be a full, clear, and exact description of the invention, such as will enable others skilled in the art to which it appertains to make and use the same.

My invention relates to inhalers for the administration of anesthetics, and has for its object to provide a simple and efficient apparatus for administering anesthetics singly or in combination with other anesthetics or with oxygen or with air and for so adjusting, regulating, and controlling the supply of air and anesthetic vapor, either separately or in admixture, that the duration and degree of anæsthesia may be determined by the operator by the manipulation of simple valve mechanism without removing or displacing the face-piece after it has been adjusted to the patient.

My invention is illustrated in the accompanying drawings, in which—

Figure 1 shows an arrangement thereof for administering two gases. Fig. 2 is a perspective view of the multiple-way respiratory valve. Fig. 3 shows the Y connection with regulator-valve for proportioning the amounts of the gases delivered to the respiratory valve. Fig. 4 is a transverse section of the right leg of the Y, showing the arrangement of regulating-valve therein. Figs. 5, 6, and 7 are longitudinal sectional views, with parts in elevation, showing the various arrangements of the respiratory valve.

Referring to the drawings, the numeral 1 represents an open hollow cylindrical shell or casing provided with a tapered nipple 2, constituting a connection for the face-piece. Said cylindrical casing 1 is provided with an L-shaped slot near its forward end, a hollow chamber 4, having a lateral opening 5 on its upper side, and an outwardly-opening check-valve 6, hereinafter designated as the "expiratory valve," above an orifice 6', connecting said chamber with the interior of the casing, and a downwardly-projecting nipple 14, adapted to connect the casing with a source of supply of gas. Fitting neatly within the casing 1 and constituting therewith a telescoping connection is a second hollow shell or section 7, having an open end adjacent to the nipple 2, a closed end 13 opposite thereto, so that when the inner section is forced completely within the outer section it occupies the cylindrical portion thereof, as shown in Figs. 5 and 6. The inner section 7 is provided with an elongated circumferential opening 8, adapted to register with orifice 6' in the outer section when the inner section is forced fully within the outer section; an L-shaped orifice 10, adapted to register with opening 3 in section 1; two openings 9 9', adapted to register successively with the nipple 14 as the inner section is moved outward, and a foraminated diaphragm carrying a check-valve 11, disposed between openings 9 and 9'. A handle 12, secured to the inner section 7, projects through the L-shaped slot 3 and is guided therein to determine the several positions of the inner section with respect to section 1.

Attached to the nipple 14 by sleeve 20, which forms a slip-joint therewith, is a Y-coupling consisting of branches 21 and 21, connecting, respectively, with gas-bags 30 and 31, which in turn may be connected by flexible tubing provided with stop-cocks with any preferred form of gas cylinders or reservoirs. In administering two gases it is often desirable and necessary to accurately regulate the proportions of each, and to enable the operator to quickly determine and adjust the relative amounts of the gases one leg 22 of the Y-coupling is provided with a regulator-valve comprising two diametrically opposite quadrant-shaped leaves 25 and a peripheral rim 24, rotatably mounted on a stud or pin 26 in a diaphragm 23, secured in the leg 22. Said diaphragm is provided with two opposite approximately quadrant-shaped openings, which may be covered or uncovered to any desired extent by the leaves of valve 25. A handle 27, secured to the rim 24, projects through a slot 24' in the leg 22, which handle carries a spring 28, having in its end a pin 29, adapted to engage one of a circumferential row of depressions 30, which are disposed at determinate distances apart and serve when engaged by pin 29 to indicate the position of valve 25. When the handle 27 is moved to the extreme left of slot 24', the valve 25 is in open position and the extent of the opening as compared with the cross-section of leg 21 is one-half. Hence one-half as much gas passes by way of leg 22 as by way of leg 21. This ratio may be diminished as desired by moving handle 27 to the right, thereby decreasing the amount of the valve-opening until the latter is closed and no gas flows by way of leg 22.

Removably secured to the nipple 2 by the sleeve 40 is a face-piece 41, having the usual rubber edge 42, provided with inflated rim 43 with the ordinary form of inflation tube or nipple 44. In the particular form of face-piece shown the ordinary type of hood is adapted to inclose the mouth and nose of the patient; but it is to be understood that this may be replaced by the well-known form of mouthpiece or any other type of face-piece.

The apparatus above described is particularly designed for the administration of gas for the production of anæsthesia without the accompanying symptoms of intense cyanosis and asphyxia. Thus in the administration of nitrous oxid asphyxial phenomena are entirely avoided when the gas is combined with pure oxygen gas. After applying the face-piece it is unnecessary to remove the same for any purpose until anæsthesia is complete, and the several operations by which the latter is attained are as follows: When the face-piece is placed in position, the respiratory valve is adjusted to permit free respiration of air—that is to say, openings 8 and 10 of the inner section 7 register with openings 6' and 3 of the outer section 1, as indicated in Fig. 5. In this position the gas-supply is cut off by the imperforate part of the inner cylinder, which overlies the nipple 14. Air entering by way of registering orifices 3 and 10 passes by the valve 11 to the patient and upon expiration by him is forced past valve 6 to the atmosphere. When the handle 12 is turned upward in the vertical arm of the L-shaped slot 3, the inner cylinder is rotated until slot 10 passes out of registry with the slot 3 and air is excluded, and orifice 9' passes into registry with nipple 14, admitting gas from the source of supply, which passes through valve 11 and is inspired by the patient and is forced out by way of valve 6 upon expiration. If the handle be now pushed forward in the horizontal portion of slot 3 until the inner cylinder 7 occupies the position indicated in Fig. 7, the opening 6', leading to the expiratory valve 6, is closed by the imperforate portion of cylinder 7 and orifice 9 on the opposite side of valve 11 to orifice 9' registers with nipple 14, in which position of the apparatus the patient is caused to breathe back and forth into the gas-bag. In administering two gases—for example, nitrous oxid and oxygen—it is desirable and necessary to adjust the proportions of the gases to meet the changing conditions of the patient while undergoing anæsthesia. This may be readily accomplished by the operator, who simply turns the regulator-valve to the left or right to admit more or less oxygen, as the condition of the patient may require. Of course it is to be understood that the apparatus may be employed for the administration of a single gas with or without the interposition of the index-bag 30 or 31. If at any time during the operation it is found necessary to permit the patient to breathe air, and therefore to suspend the gas administration, it is only necessary to move the inner cylindrical section to the initial position, as shown in Figs. 2 and 5, whereby air is admitted by way of slots 3 and 10 and the supply of gas is interrupted by the imperforate portion of cylinder 7 closing the nipple 14.

The above-described apparatus is exceedingly simple in construction and mode of operation, is susceptible of ready and thorough cleansing and sterilization, and is applicable to the various forms and methods of gas administration without material change.

Having thus described my invention, what I claim is—

1. An inhaler comprising telescoping cylindrical sections, an exhalation-valve in the outer section, and an inhalation-valve in the inner section adjustable to opposite sides of the gas-inlet, said telescoping sections having coöperating orifices whereby respiratory circulation may be maintained respectively as follows, from and to the atmosphere, from the gas-supply to the atmosphere, or from and to the gas-supply.

2. An inhaler, comprising an outer cylindrical section having an inlet communicating with the gas-supply, an outlet to the mouthpiece, an air-inlet, and an air-outlet closed by an exhalation-valve; an inner cylindrical section telescoping with said outer section, said inner section having two orifices adapted to register successively with the gas-supply inlet, an inhalation-valve closing said inner section between said inlet-orifices, an orifice to register with the air-inlet, an orifice to register with the air-outlet; and means to adjust the inner section with respect to the outer section, whereby respiration may be maintained from and to the atmosphere, from the gas-supply to the atmosphere, or from and to the gas-supply.

3. An inhaler, comprising an outer cylindrical section having a valved expiratory passage, nippled connections with the mouthpiece and the gas-supply respectively, and an air-inlet in the body thereof; an inner section rotatably and slidably mounted in said outer section, said inner section having an open end registering with the mouthpiece connection, two orifices adapted to register successively with the gas-supply connection, an inhalation-valve extending across said inner section between said last-mentioned orifices, an orifice adapted to register with the expiratory passage, and an orifice adapted to register with the air-inlet passage; and a handle connected to said inner section and projecting through the outer section, whereby the sections may be adjusted to open connection from and to the atmosphere, from the gas-supply to the atmosphere, or from and to the gas-supply.

4. An inhaler, comprising telescoping cylindrical sections, having means for maintaining respiration from and to the atmosphere, from a gas-supply to the atmosphere, or from and to a gas-supply, a face-piece communicating with said sections, a duplex gas-supply, a Y-coupling connected with said supply, and a regulator-valve in said Y-coupling to adjust the proportions of the gases passing therethrough.

5. An inhaler, comprising a face-piece, a multiple-way respiratory valve connected thereto, adapted to maintain respiration from and to the atmosphere, from a gas-supply and to the atmosphere, or from and to a gas-supply, a duplex gas-supply, a Y-coupling connected with said supply, and a regulator-valve in said Y-coupling to adjust the proportions of the gases passing therethrough.

6. An inhaler, comprising a face-piece, a multiple-way respiratory valve connected thereto, adapted to maintain respiration from and to the atmosphere, from a gas-supply and to the atmosphere, or from and to a gas-supply, a duplex gas-supply, a Y-coupling connecting said respiratory valve and said gas-supply, and a rotary regulator-valve in one branch of said Y-coupling to adjust the proportions of gases passing to the respiratory valve.

In testimony whereof I affix my signature in presence of two witnesses.

SYDNEY ORMOND GOLDAN.

Witnesses:
O. M. THOWLESS,
FREDERICK H. DAVIS.